United States Patent [19]
Niemoller et al.

[11] 3,809,801
[45] May 7, 1974

[54] POST-TYPE INSULATOR ASSEMBLY FOR ENCLOSED ELECTRIC BUS

[75] Inventors: Arthur B. Niemoller; Fred H. Ford, both of Cincinnati, Ohio

[73] Assignee: Westinghouse Electric Corporation, Pittsburgh, Pa.

[22] Filed: May 24, 1973

[21] Appl. No.: 363,764

[52] U.S. Cl. .............................. 174/99 B, 174/171
[51] Int. Cl. .............................................. H02g 5/06
[58] Field of Search ... 174/68 B, 99 B, 99 E, 149 B, 174/171

[56] References Cited
UNITED STATES PATENTS

| | | | |
|---|---|---|---|
| 3,061,665 | 10/1962 | Rugg et al. | 174/99 B X |
| 3,221,097 | 11/1965 | Cognet et al. | 174/99 B |
| 3,351,705 | 11/1967 | Niemoller | 174/99 B |
| 3,483,396 | 12/1969 | Lightbody et al. | 174/99 B X |
| 3,569,606 | 3/1971 | Clin | 174/99 E X |
| 3,585,270 | 6/1971 | Trump | 174/99 B UX |
| 3,712,953 | 1/1973 | Boersma et al. | 174/99 B |

*Primary Examiner*—Laramie E. Askin
*Attorney, Agent, or Firm*—H. G. Massung

[57] ABSTRACT

An improved post-type insulator assembly is provided for supporting an elongated hollow electric bus conductor within a surrounding metal house. Access holes or openings are provided in the outer metal housing through which a post-type insulator can longitudinally pass. A slot is provided in the hollow bus conductor through which a retainer attached to the end of the post-type insulator can pass, when the post-type insulator is being positioned to support the hollow bus conductor. Rotation of the post-type insulator a predetermined angle causes the retainer to engage the inner surfaces of the hollow bus conductor and firmly connects the hollow bus conductor to the post-type insulator. Rotation of the post-type insulator through the predetermined angle also positions a portion of the post-type insulator support assembly in a casting which is attached to the outer housing, and prevents movement of the post-type insulator. The casting has an opening which forms the access opening in the outer housing. An access cover is provided to close the access opening. The access opening provided in the outer housing, through the casting, is only of a slightly larger diameter than the insulator used to support the hollow bus conductors. The mounting hardware used to mount the access cover over the access opening also provides a locking function to prevent rotational movement of the post-type insulator after the access cover is attached.

12 Claims, 9 Drawing Figures

3,809,801

POST-TYPE INSULATOR ASSEMBLY FOR ENCLOSED ELECTRIC BUS

BACKGROUND OF THE INVENTION

This invention relates to post-type insulator assemblies for supporting an electric bus conductor within a metallic housing. The disclosed post-type insulator assembly is particularly adaptable for use on a bus of the type in which all the phase conductors are mounted within a single metallic enclosure. This type of bus is commonly referred to as non-segregated bus.

In prior art non-segregated phase bus as shown in U.S. Pat. No. 2,977,404 and U.S. Pat. No. 3,170,030, the bus conductors are supported from post-type insulators extending from a common base supported at the center of the metallic housing. A problem with this type of insulating support is that the post-type insulators used cannot be quickly and easily removed from the metal housing. Another disadvantage in having the post-type insulators extend from a common base located at the center of the metallic housing is that during a short circuit large tension forces are placed on the insulators.

SUMMARY OF THE INVENTION

An electric bus structure comprising a hollow bus conductor disposed within a tubular housing is provided. An insulator for supporting the bus conductor is disposed between the housing and the bus conductor. The insulator is provided with mounting devices which allow the insulator to be attached to the bus conductor and the tubular housing when rotated through a predetermined angle. An access hole of a slightly larger diameter than the post-type insulator is provided for removing the insulator from the electric bus after it has been disconnected from the housing and the hollow bus conductor. The post-type insulator can be removed longitudinally through the access opening provided. When the post-type insulator with mounting devices attached is disposed within the electric bus and rotated so as to engage the bus conductor and the metal housing, a cover can be attached to the access openings which closes the openings and prevent any substantial rotational movement of the post-type insulator assembly.

In accordance with one embodiment of the invention, the conductors of a three-phase distribution system are symmetrically disposed inside a cylindrical housing. The cylindrical housing is preferably formed from a metallic material such as aluminum which is electrically conducting for shielding purposes and non-magnetic to avoid excessive losses in the housing. This construction of non-segregated phase bus has a round enclosure using post-type insulators. The three phase conductors are arranged in a triangular configuration inside the metallic housing. The center of the described triangle is approximately the same as the center of the tubular metallic housing. The conductors are supported by radially disposed insulators spaced at 120° angles and mounted from the inner surface of the tubular metal housing. The insulators are mounted radially between the phase bus conductors and the metal housing. Special mounting devices allow the insulators to be detached from the bus conductors and the metal housing by a 90° rotation. They can then be lifted out through openings provided in the metal house.

The insulators can thus be easily removed from the electric bus structure for inspection and maintenance. With the insulators disposed radially between the bus conductors and the tubular metal housings more efficient use is made of the insulator strength in resisting short circuit force. The major short circuit forces which occur will place the insulators in compression and it is in compression that porcelain insulators have the greatest strength.

It is an object of this invention to provide an improved means for suppporting bus conductors in a non-segregated phase bus structure.

Another object of this invention is to provide an improved means for permitting access to the insulating support disposed within the metal housing of a non-segregated phase bus structure.

A still further object of this invention is to provide an improved bus structure in which the insulating supports can be quickly and easily disengaged from the bus conductors and the metal housing and easily removed from the metal housing.

BRIEF DESCRIPTION OF THE DRAWINGS

For a better understanding of the invention, reference may be had to the preferred embodiment exemplary of the invention shown in the accompanying drawings, in which.

DESCRIPTION OF THE PREFERRED EMBODIMENT

Figure 1:
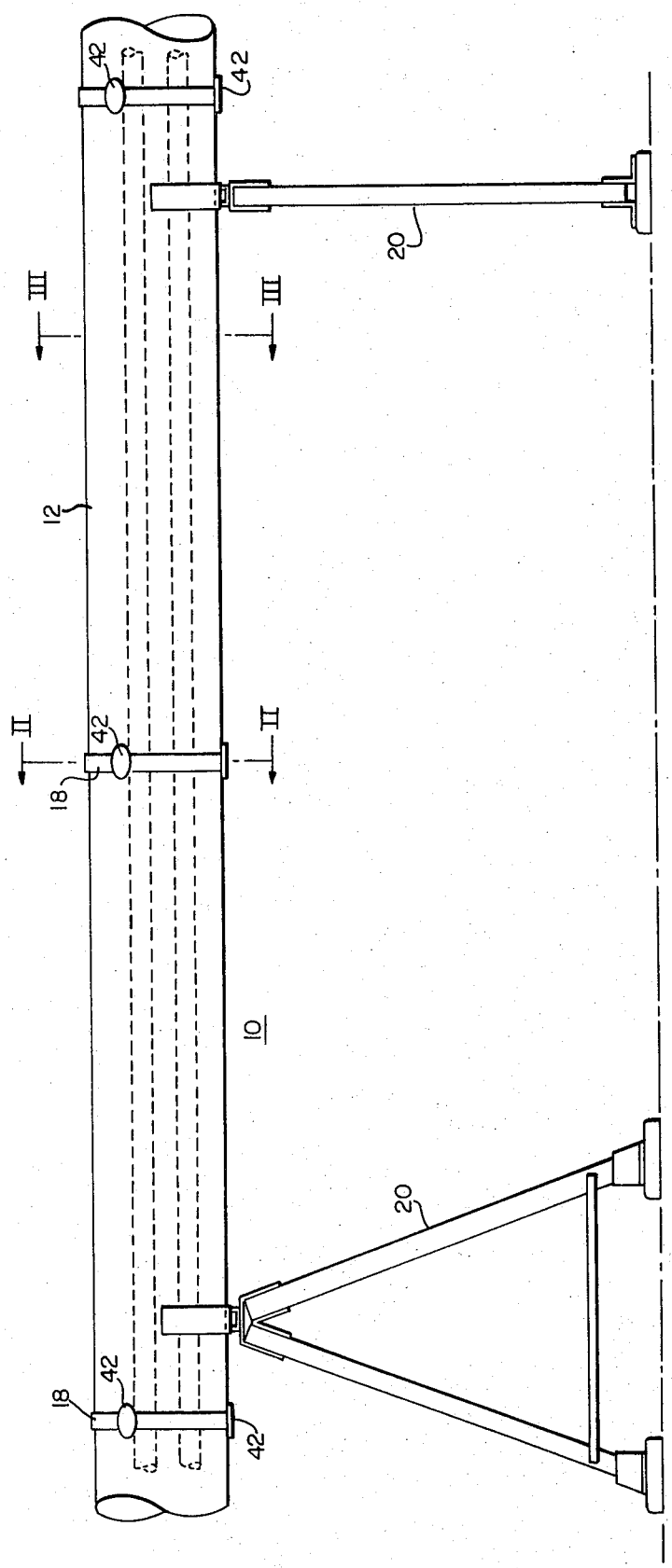
FIG. 1 is a front elevation view of a section of non-segregated phase bus.
Figure 2:
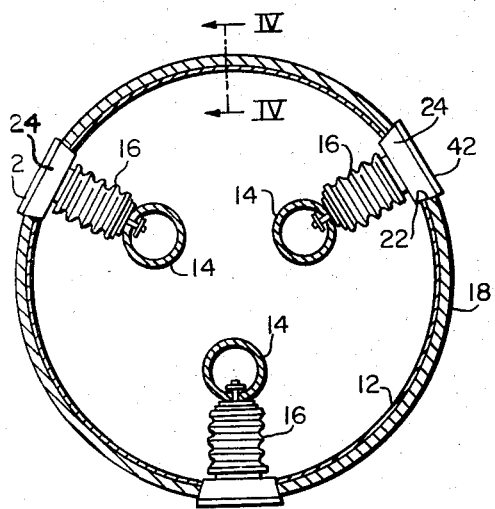
FIG. 2 is a section view of the non-segregated bus shown in FIG. 1 along the line II—II.
Figure 3:
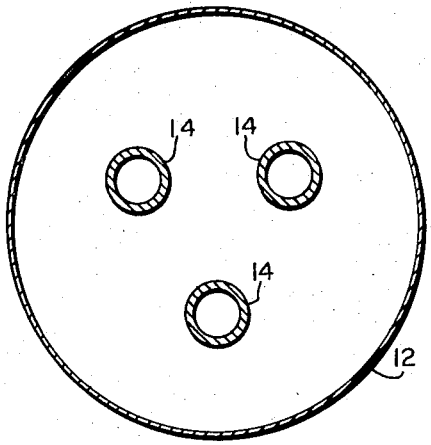
FIG. 3 is a section view of the non-segregated bus shown in FIG. 1 along the lines III—III.
Figure 4:
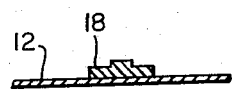
FIG. 4 is a section view of a portion of the bus shown in FIG. 2 along the lines IV—IV.

Referring now to the drawings and FIGS. 1 to 4 in particular, there is shown a section of non-segregated phase bus 10 embodying the teaching of the present invention. The disclosed non-segregated phase bus utilizes a round metallic enclosure 12 for housing the three phase conductors 14. The three hollow conductors 14 are arranged in a triangular configuration within the metal housing 12. Insulators 16 for supporting the bus conductors 14 are mounted radially between the bus conductors 14 and the metal enclosure 12. As can thus be seen in FIGS. 2 and 4 an aluminum brace 18 is attached to the outside of metal housing 12 between insulators 16 to provide additional strength. Insulator 16 can be formed from any suitable insulating material such as porcelain.

By mounting insulator 16 radially between the conductor 14 and the inside of enclosure 12 more efficient use is made of the insulators 16 strength in resisting short circuit forces. The major short circuit forces will place the insulator 16 in compression and it is in compression that porcelain insulators have their greatest strength. Calculations indicate that the maximum cantilever force on the insulator 16 is one-half of the maximum compression force. The maximum cantilever force will be realized only if a short circuit fault occurs 45° after voltage zero. The maximum compression force will occur if the short circuit fault occurs at voltage zero. The maximums of the two forces cannot occur as the result of any one fault.

The housing 12 of the non-segregated phase bus is supported by structural members 20. The structural members 20 and the housing 12 of the non-segregated phase bus are all maintained at ground potential by virtue of an electrical connection provided between each section of housing 12 and the structural members 20. Openings 22 are formed in the housing 12 in which are mounted base castings 24. The base castings 24 are attached to the housing 12 and the aluminum braces 18 by suitable means such as welding or brazing. Base casting 24 has a circular opening 26 therethrough of a slightly larger diameter than the insulator 16. Mounting members 28 and 30 attached to the respective opposite ends of insulator 16 allow the insulator 16 to be detached from the bus conductor 14 and the base castings 24 by a 90° rotation. The insulator 16 can then be lifted out through the opening 26 formed in base casting 24.

Figure 5:
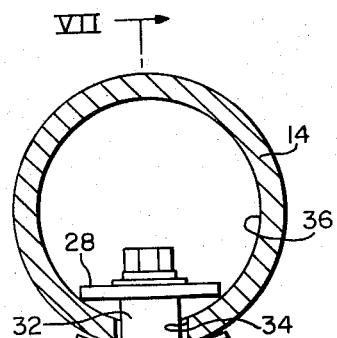
FIG. 5 is an enlarged view of one of the insulator assemblies shown in FIG. 2.
Figure 5:
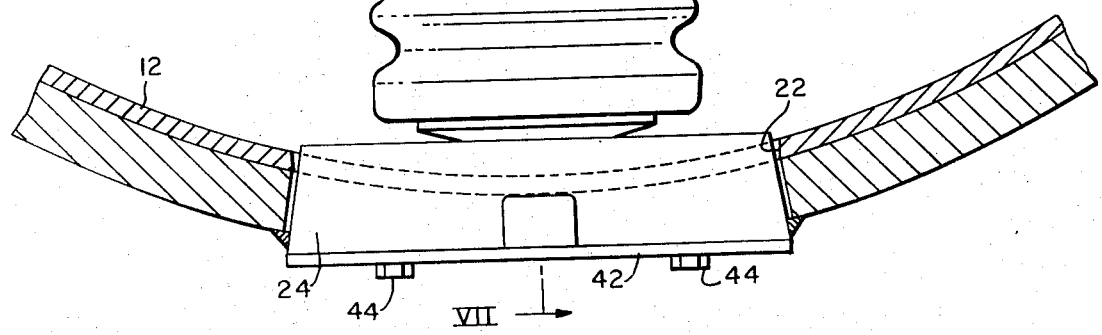

The conductor mounting member 28 attached to the top of insulator 16 has a generally T-shaped portion 32. The bus conductor mounting member 28 is rigidly attached to insulator 16 and when assembled to insulator 16 cannot be rotated with respect to insulator 16. Bus conductor 14 has an elongated opening 34 formed therein for receiving the T-shaped portion of conductor mounting member 28. The top of T-shaped portion 32 is constructed to fit easily through opening 34 when in alignment with opening 34. As can best be seen in FIG. 5, when the insulator 16 is rotated so that the top of T-shaped portion 32 is perpendicular to the longitudinal axis of opening 34 in conductor 14, the outer ends of the T-shaped portion 32 engage the inner walls 36 of hollow conductor 14. This securely connects insulator 16 to hollow conductor 14. Thus, when the longitudinal axis of the T-shaped portion is aligned with the longitudinal axis of opening 34 the insulator 16 is disengaged from conductor 16, and when the longitudinal axis of T-shaped portion 32 is perpendicular to the longitudinal axis of opening 34 the insulator 16 is securely connected to conductor 14. When the insulator 16 is disengaged from the hollow conductor 14 it can be removed from the electric bus 10 by being lifted out through opening 26 in base casting 24.

Figure 8:
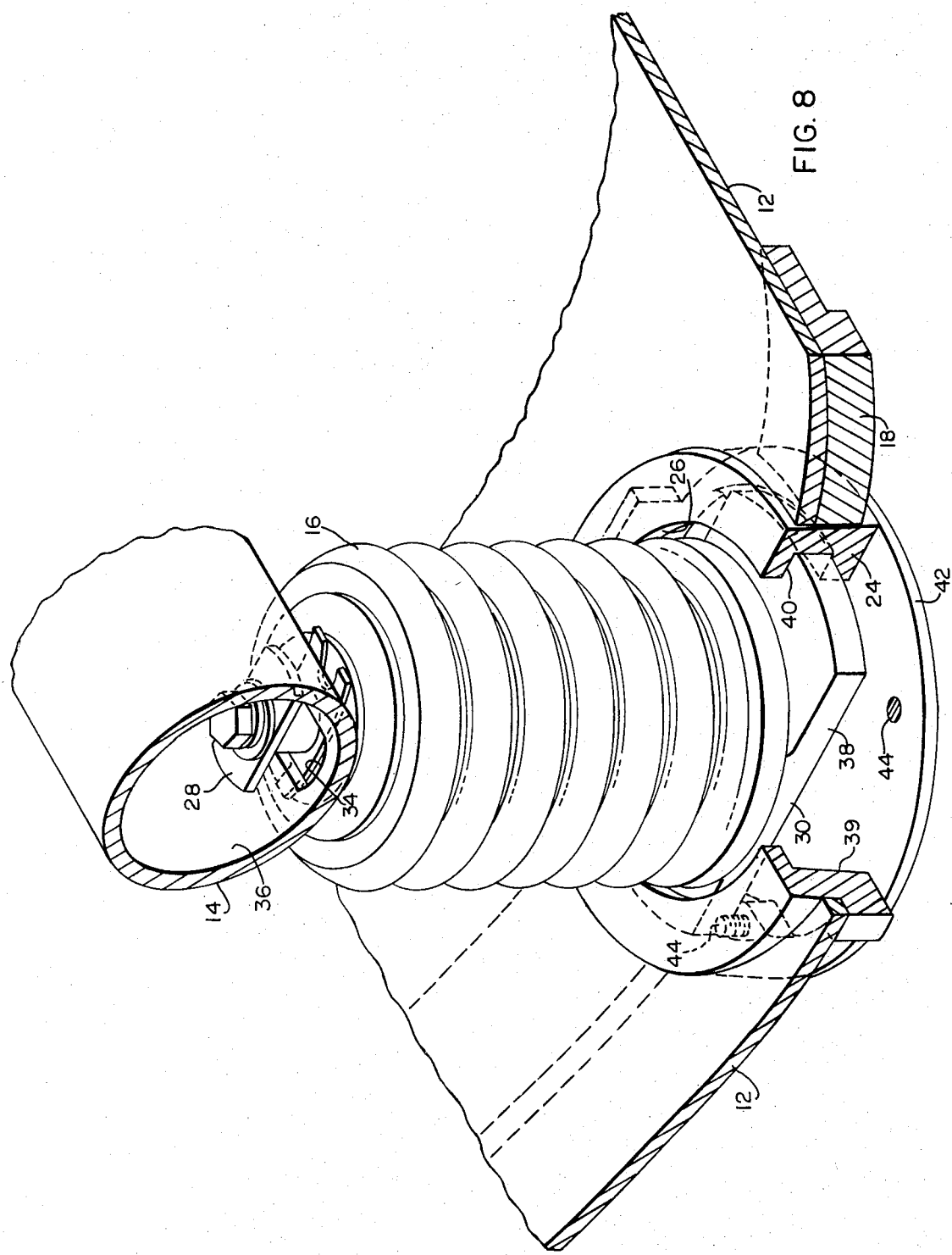
FIG. 8 is an isometric view of the insulator assembly shown in FIG. 5.

The slot 34, as shown in FIG. 8, allows limited longitudinal movement of bus conductor 14, this is necessary to allow for thermal expansion of bus conductor 14. However, at certain insulator locations it is desirable to restrain longitudinal movement of bus conductor 14, and this can be accomplished by constructing the T-shaped portion 32 and the slot 34 so that when insulator 16 is in position, the body of the T-shaped portion 32 engages offsets formed in slot 34.

Figure 6:
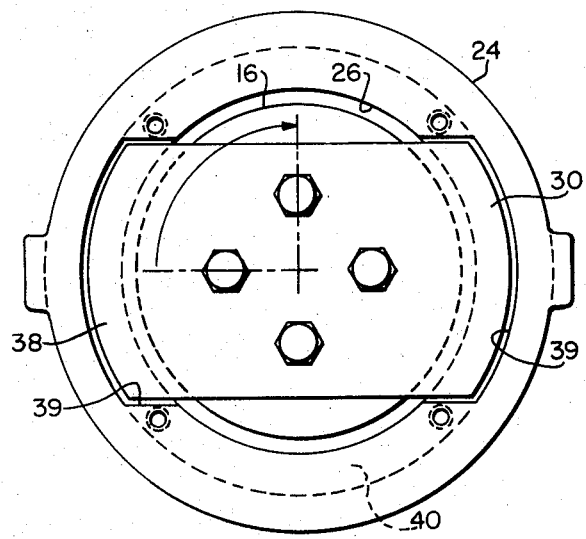
FIG. 6 is a bottom view of the insulator assembly shown in FIG. 5 with the insulator rotated 90° and the access opening cover plate removed.
Figure 9:
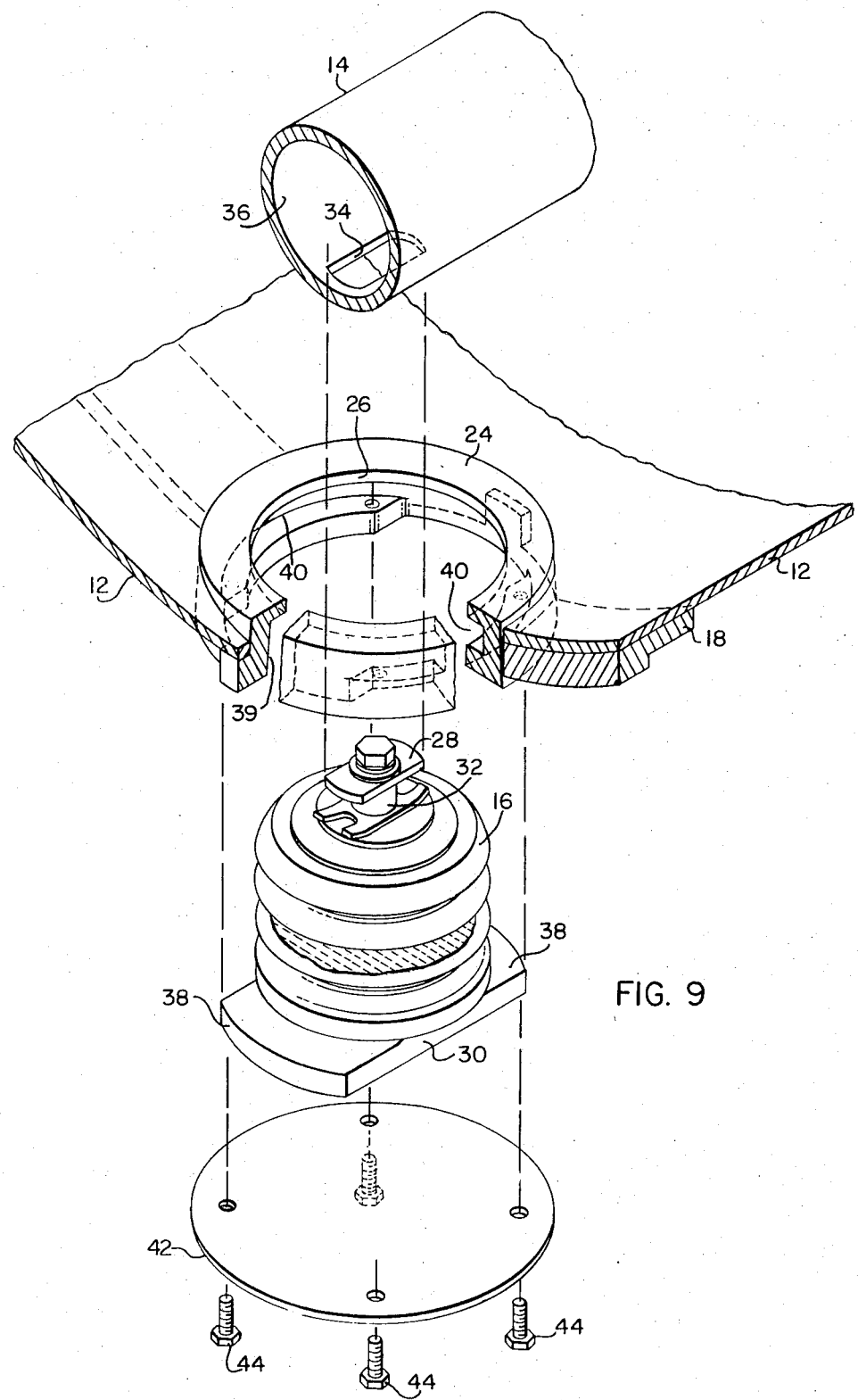
FIG. 9 is an exploded isometric view of the insulator assembly shown in FIG. 8.

Base casting 24 comprises an annular ring having a generally U-shaped cross sectional configuration, with the open portion 40 of the U-shaped cross section facing the center of the ring. This U-shaped cross sectional configuration can be seen in FIG. 9. Base mounting member 30 is rigidly secured to the bottom of insulator 16. When conductor mounting member 28 and base mounting member 30 are secured to insulator 16, a rigid assembly with no relative part motion is formed. Base mounting member 30 has a flanged portion 38. As can best be seen in FIG. 6, a pair of cutouts 39 are formed in the bottom leg of U-shaped casting 24 to receive the flanged portion 38. The upper leg of the U-shaped casting 24 is not cut out so that when the base member 30 is inserted through opening 26, flanged portion 38 is retained in the annular slot 40. If the insulator 16 is then rotated 90°, flanged portion 38 in conjunction with the legs of U-shaped casting 24 prevent longitudinal movement of insulator 16.

Figure 7:
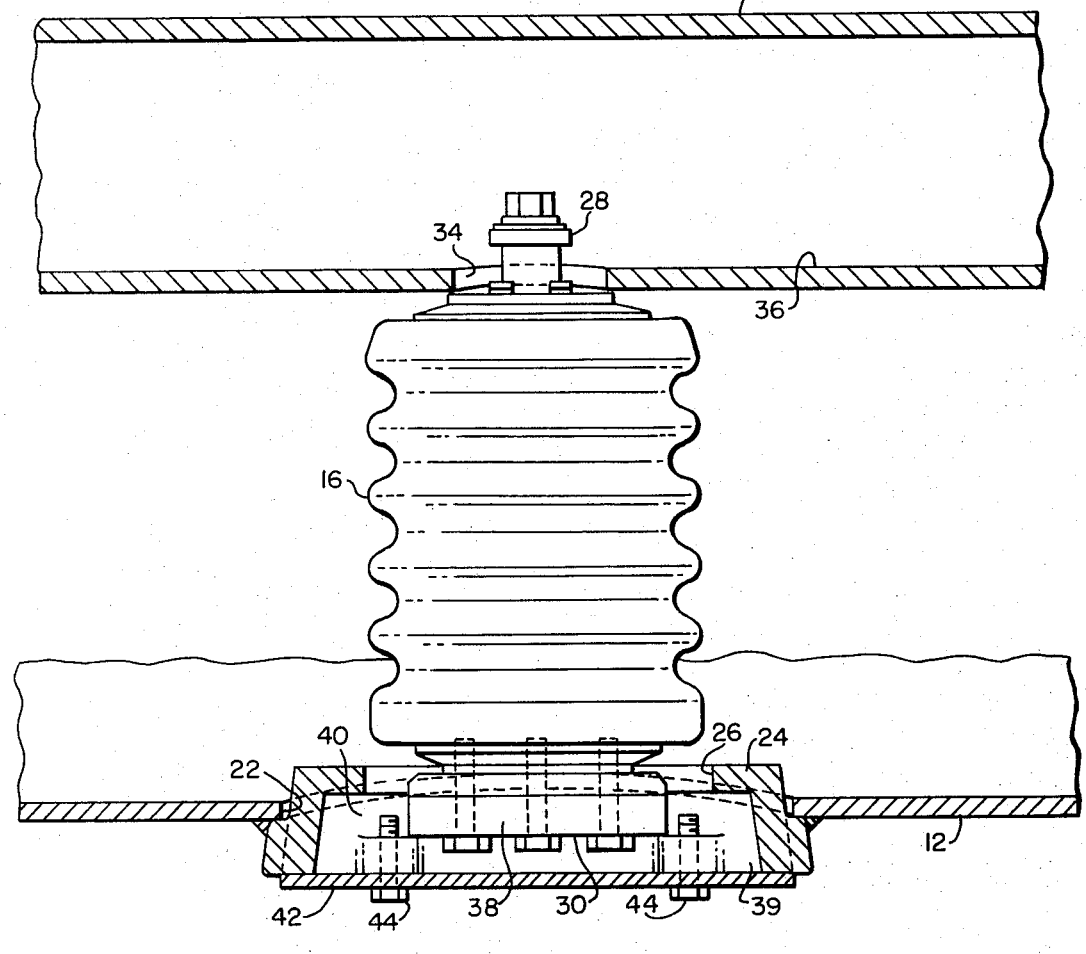
FIG. 7 is a section view of the insulator assembly shown in FIG. 5 along the lines VII—VII.

A cover plate 42 is provided to cover the opening 26 formed through casting 24. Cover plate 42 is attached to casting 24 by mounting bolts 44. As can be seen in FIG. 7, when the flanged portion 38 of mounting base 30 is perpendicular to the cutout 39, and bolts 44 secure cover plate 42 to casting 24, mounting base 30 is prevented from rotating. The protrusion of the ends of bolts 44 into slot 40 interferes with any rotation of base member 30. Thus with the cover plate in place, and the flange 38 aligned perpendicular to the cutout 39, insulator 16, conductor mounting member 28 and base mounting member 30 are restrained against any substantial movement. A limited amount of freedom is built into the mounting. This allows clearance to facilitate installation and removal of the insulators 16. This also allows for slight movement of the conductors during short circuit conditions which will help absorb a large portion of the short circuit forces.

With cover plate 42 and mounting bolts 44 removed, insulator 16 can be detached from bus conductor 14 and from base casting 24 by a 90° rotation. Insulator 16 can then be lifted out through the opening 26 in base casting 24 for inspection or maintenance. The access opening 26 formed in base casting 24 is only slightly larger in diameter than the insulator 16. Insulator 16 is removable from outside enclosure 12 through access opening 26 without working within the metal housing 12. The disclosed construction allows for maximum current capacity with minimum space requirements. The round enclosure 12 because of its shape has a high bending strength and longitudinal supports are not required permitting a greater distance between enclosure support than with other shaped enclosures. When insulator 16 is rotated to disengage it from housing 12, it is also disengaged from conductor 14. This quick disconnect feature allows easy removal of insulator 16.

We claim:

1. An electric bus structure comprising:
 a hollow tubular and having an access opening formed therein;
 a hollow bus conductor extending longitudinally within said hollow tubular housing an having an opening formed therein;
 an insulator disposed radially inward from the access opening formed in said hollow tubular housing supporting said hollow bus conductor and being releasably secured at one end to said hollow tubular housing;
 bus mounting means attached to the top end of said insulator opposite the end which is secured to said hollow tubular housing and partially extending through the opening formed in said hollow bus conductor and engaging the inner surface of said hollow bus conductor to securely connect said hollow bus conductor to said insulator; and, said mounting means comprising an elongated mounting member constructed to fit through the opening formed in said hollow bus conductor, disposed perpendicular to the longitudinal axis of said hollow bus conductor and securing said hollow bus conductor to said insulator.

2. An electric bus structure comprising:
a hollow tubular housing;
a hollow bus conductor extending longitudinally within said hollow tubular housing and having an elongated opening formed therein;
an insulator supporting said hollow bus conductor being releasably secured at one end to said hollow tubular housing;
bus mounting means attached to the top end of said insulator opposite the end which is secured to said hollow tubular housing and partially extending through the opening formed in said hollow bus conductor and engaging the inner surface of said hollow bus conductor to securely connect said hollow bus conductor to said insulator;
said bus mounting means comprising a mounting member having a generally T-shaped portion being constructed to fit through the elongated opening forming in said hollow bus conductor and the ends of the top of the T-shaped portion engaging the inner surface of said hollow bus conductor when the T-shaped portion of said mounting member is disposed perpendicular to the longitudinal axis of the elongated opening formed in said hollow bus conductor to secure said bus conductor to said insulator.

3. An electric bus structure as claimed in claim 2 wherein:
said hollow tubular housing has an access opening formed therein; and including
a cover plate sealing the opening formed in said hollow tubular housing;
said insulator being detached from said hollow bus conductor and said hollow tubular housing when the top of the T-shaped portion is aligned with the longitudinal axis of the elongated opening in said hollow bus conductor; and
said insulator being disposed to pass through the access opening formed in said hollow tubular housing when said cover plate is removed.

4. An electric bus structure comprising:
a hollow tubular housing;
a hollow bus conductor extending longitudinally within said hollow tubular housing and having an opening formed therein;
an insulator supporting said hollow bus conductor being releasably secured at one end to said hollow tubular housing;
bus mounting means attached to the top end of said insulator opposite the end which is secured to said hollow tubular housing and partially extending through the opening formed in said hollow bus conductor and engaging the inner surface of said hollow bus conductor to securely connect said hollow bus conductor to said insulator;
said hollow tubular housing having an access opening formed therein;
a cover plate covering the opening formed in said hollow tubular housing;
said insulator being disposed to pass through the access opening formed in said hollow tubular housing when said cover plate is removed.

5. An electric bus structure comprising:
a hollow tubular housing having an access hole formed therein;
a hollow bus conductor extending longitudinally within said hollow tubular housing;
an insulator supporting said hollow bus conductor in a spaced apart relationship from the inner surface of said hollow tubular housing;
said insulator being constructed to pass longitudinally through the access hole formed in said hollow tubular housing;
bus connector means attached to the end of said insulator and constructed to disengage said hollow bus conductor when aligned with the longitudinal axis of said hollow bus conductor and to engage said hollow bus conductor when aligned at an angle with the longitudinal axis of said hollow bus conductor, disposed at a predetermined angle with respect to the longitudinal axis of said hollow bus conductor firmly securing said insulator to said hollow bus conductor.

6. An electric bus structure as claimed in claim 5 wherein:
said insulator has an inner end facing said hollow bus conductor and an outer end facing the inner diameter of said hollow tubular housing;
said bus connector means being attached to the inner end of said insulator; and including,
housing connector means attached to the outer end of said insulator securing said insulator to said hollow tubular housing;
said housing connector means and said bus connector means being relatively fixed; and,
said bus connector means firmly engaging said hollow bus conductor and said housing connector means engaging said hollow tubular housing preventing longitudinal movement of said insulator.

7. An electric bus structure as claimed in claim 6, including:
access hole cover means closing the access hole when said insulator is in place and secured to said hollow bus conductor; and
said access hole means comprising a cover plate and mounting means mounting said cover plate over the access hole and engaging said housing connector means preventing rotary movement of said insulator.

8. An electric bus structure as claimed in claim 7, wherein:
said mounting means comprises a plurality of bolts holding said cover plate in position and engaging a portion of said housing connector means preventing movement.

9. An electric bus structure comprising:
a hollow tubular housing having an access hole formed therein;
a hollow bus conductor extending longitudinally within said hollow tubular housing;
an insulator supporting said hollow bus conductor in a spaced apart relationship from the inner surface of said hollow tubular housing;

said insulator being constructed to pass longitudinally through the access hole formed in said hollow tubular housing;

bus connector means firmly securing said insulator to said hollow bus conductor;

said insulator having an inner end facing said hollow bus conductor and an outer end facing the inner diameter of said hollow tubular housing;

said bus connector means being attached to the inner end of said insulator; and including, housing connector means attached to the outer end of said insulator securing said insulator to said hollow tubular housing;

said bus connector means firmly engaging said hollow bus conductor and said housing connector means preventing longitudinal movement of said insulator;

access hole cover means for closing the access hole when said insulator is in place and secured to said hollow bus conductor;

said access hole means comprising a cover plate and mounting means mounting said cover plate over the access hole and engaging said housing connector means preventing rotary movement of said insulator;

said hollow bus conductor having an elongated slot formed therein; and, said bus connector means comprises a retainer formed in a generally T-shape with the top of said T-shaped retainer being of the same general shape but slightly smaller than the elongated slot formed in said hollow bus conductor so that the top of the T-shaped retainer can pass through the elongated slot.

10. An electric bus structure comprising:
a hollow tubular housing having an access hole formed therein;
a hollow bus conductor extending longitudinally within said hollow tubular housing;
an insulator supporting said hollow bus conductor in a spaced apart relationship from the inner surface of said hollow tubular housing;
said insulator being constructed to pass longitudinally through the access hole formed in said hollow tubular housing;
bus connector means firmly securing said insulator to said hollow bus conductor;
said insulator having an inner end facing said hollow bus conductor and an outer end facing the inner diameter of said hollow tubular housing;
said bus connector means being attached to the inner end of said insulator; and including,
housing connector means attached to the outer end of said insulator securing said insulator to said hollow tubular housing;
said bus connector means firmly engaging said hollow bus conductor and said housing connector means preventing longitudinal movement of said insulator;
access hole cover means closing the access hole when said insulator is in place and secured to said hollow bus conductor;
said access hole means comprising a cover plate and mounting means mounting said cover plate over the access hole and engaging said housing connector means preventing rotary movement of said insulator; and,
a base casting forming an annular ring having a generally U-shaped cross sectional area with the open portion of said U facing the center and the bottom portion of said base casting having a cutout formed therein;
said base connector means having a flange portion which is constructed so as to pass through the cutout in said base casting when said insulator is disposed within said hollow tubular housing.

11. An electric bus structure comprising:
a hollow housing having an access opening formed therein;
a hollow conductor disposed within said hollow housing and having an opening formed therein;
an insulator disposed above the access opening internal of said hollow housing releasably secured at a first end to said hollow housing and connected at a second end to said hollow conductor; and
a mounting member rigidly secured to the second end of said insulator and partially projecting through the opening in said hollow conductor and engaging the inner surface of said hollow conductor to securely connect said hollow conductor to said insulator.

12. An electric bus structure comprising:
a hollow cylindrical housing having three openings radially spaced at 120° formed therein;
a cover for each of the openings formed in said hollow cylindrical housing;
three phase conductors symmetrically disposed inside said hollow cylindrical housings and extending longitudinally of said hollow cylindrical housing;
three insulators radially disposed at 120° angles supporting the phase conductors; and
each insulator being releasably secured at one end to one of said phase conductors and releasably secured at the other end to said housing at one of the openings;
each insulator being disposed to pass through the associated opening generally transverse with respect to the associated phase conductor when said cover for the opening is removed.

* * * * *